March 18, 1941.  F. RAY  2,235,622
METHOD FOR TESTING TIRE CORDS
Filed Sept. 2, 1937  2 Sheets-Sheet 1
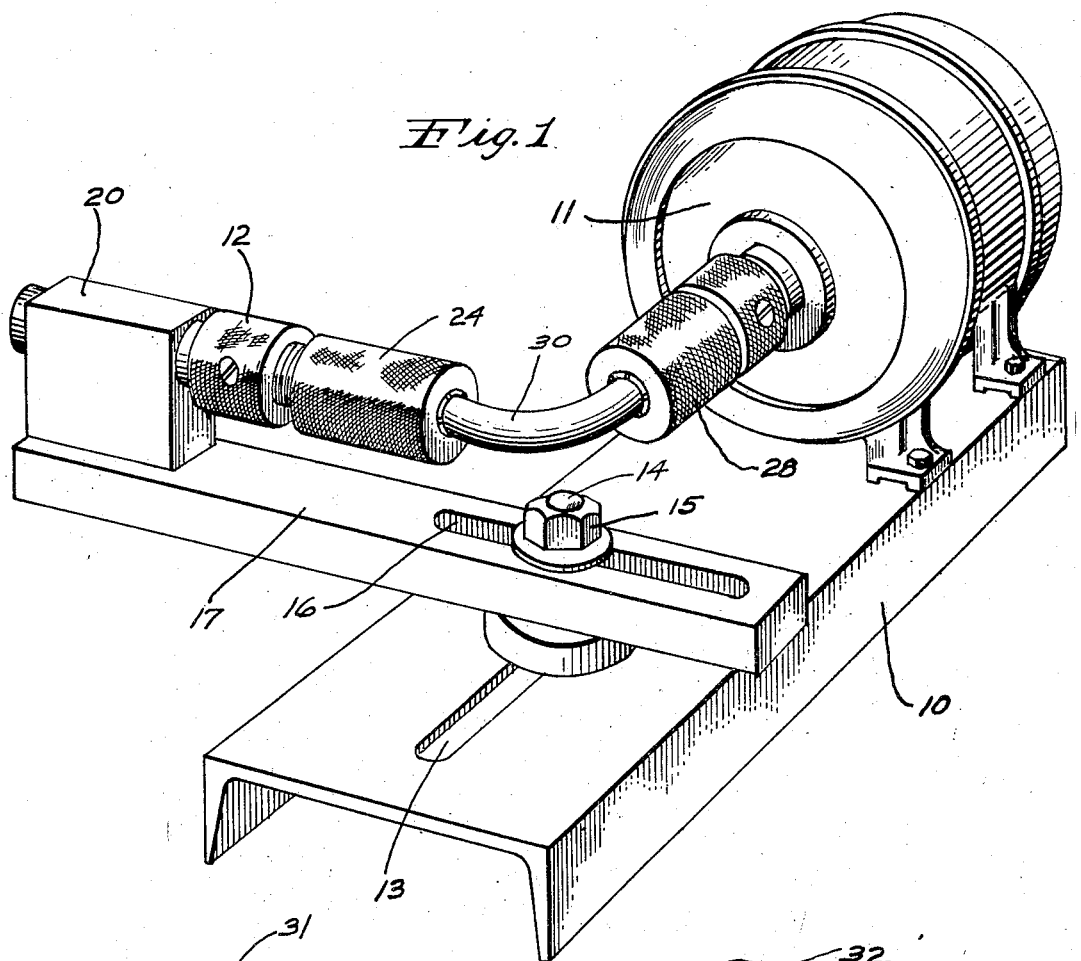
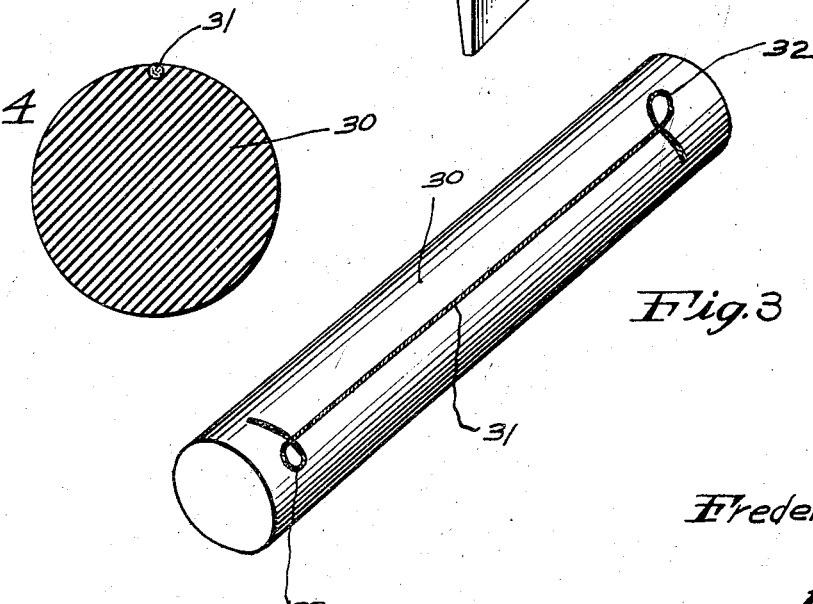
Inventor
Frederick Ray
By
Attorney

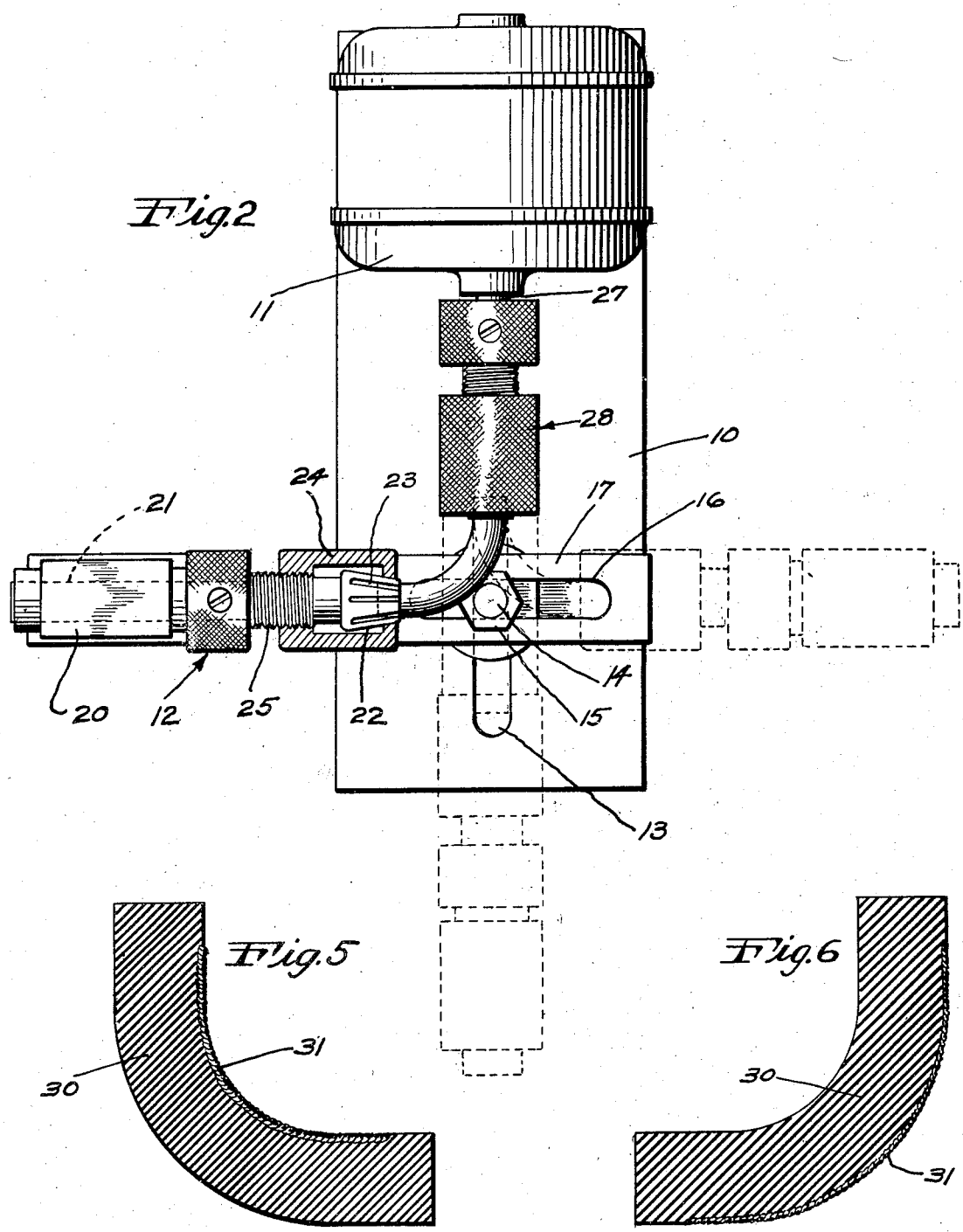

Patented Mar. 18, 1941

2,235,622

UNITED STATES PATENT OFFICE 2,235,622

METHOD FOR TESTING TIRE CORDS

Frederick Ray, Short Hills, N. J., assignor to Wingfoot Corporation, Wilmington, Del., a corporation of Delaware Application September 2, 1937, Serial No. 162,160

4 Claims. (Cl. 73—51)

This invention relates to methods for testing textile elements, and it refers more particularly to methods for determining fatigue resistance and durability of tire cords and the like under various operating conditions.

Heretofore several types of so-called durability machines have been used in making laboratory tests of tire-cord samples, but, while some of them have been reasonably efficient as far as they went, they have given rise to objections for several reasons. By way of example of such prior-art machines, reference is made to the Buffum Patent No. 1,785,690. In the machines of Buffum and others, the cords are subjected to tension and bending by being moved back and forth over a grooved pulley, and by recording the number of reciprocations of the cord before failure, some measure of some properties of the cord may be obtained. While such measure is useful to some extent, it is not as accurate as is desired for the reason that the stresses to which the cords are subjected during test are not comparable to those prevailing in a tire under regular operating conditions. Thus, some cord samples that give good account of themselves in the Buffum-type machines are not necessarily good for use in tires because the operating conditions are different from the testing conditions.

The objectionable features of the prior art are overcome by the present invention, which, in its broad aspect, has among its objects the provision of novel methods for testing cords or textile elements under conditions substantially the same as those prevailing in an operating tire. More specifically, the invention contemplates securing the cord in a test piece of rubber or equivalent flexible material, and then manipulating or operating upon said test piece in such a manner as to subject the cord repeatedly to tensile, compressive, and bending forces of substantially the same magnitude as those to which like cord would be subjected in a tire. In one form of the invention the cord sample is secured longitudinally in a substantially cylindrical rod-like body of rubber having the properties of sidewall stock. This rubber test-piece is then secured between a pair of rotatable jaws or holders, and is bent by adjustment of one of said holders angularly with reference to the other. Power is then applied to one of the holders to rotate the test piece in its bent condition, and by noting the number of revolutions and the time elapsing before failure, an accurate measure of the cord's qualities may be obtained. The amount that the test piece may be bent, may be widely varied to simulate different tire-operating conditions of load, and the speed of rotation may be likewise varied.

The foregoing and other objects, features and advantages of the invention will be readily appreciated from the following description in conjunction with the accompanying drawings wherein the invention has been shown merely by way of illustration and wherein:

Fig. 1 is a perspective view of one form of testing machine embodying the invention;

Fig. 2 is a top plan view thereof with chuck in section;

Fig. 3 is a perspective view of one form of test specimen made in accordance with the invention;

Fig. 4 is an enlarged transverse sectional view therethrough;

Fig. 5 is a longitudinal sectional view through the bent test-piece and showing the cord under compression; and Fig. 6 is a similar view showing the cord under tension.

Referring now to Figs. 1 and 2 of the drawings, it will be seen that the testing machine there illustrated comprises a base 10 which supports a head stock 11 and a tail stock 12. The base 10 may be of any preferred form and construction and is preferably provided with a longitudinal slot 13 for accommodation of an adjustable clamping bolt 14 which has associated with it a suitable clamping nut 15. The clamping bolt 14 extends upwardly from the base 10 and through a slot 16 in a bar or the like 17, which constitutes the lower portion of the tail stock 12. Thus, it will be seen that by loosening the clamping nut 15, the tail stock 12 may be moved toward and away from the head stock 11 and also the tail stock may be swung about the axis of the clamping bolt 14, whereby to change the angular relationships between the axis of the head stock and the tail stock. This adjustment will be more fully described hereinafter.

A pedestal 20 rising from the bar 17 provides a substantial bearing for a tail stock shaft 21 which is freely rotatable, preferably in association with anti-friction elements not shown. The inner end of the shaft 21 or a suitable extension thereof is hollow and is externally tapered, as at 22, and formed with a plurality of slits 23 to provide resiliency for its cooperation with a clamping collar 24 which is axially movable through the medium of screw threads 25. The structure just described is in effect a collet or chuck and constitutes means for gripping and holding one end of a test specimen to be described. The head stock 11 in the illustrated embodiment is merely an electric motor having mounted upon its shaft 27 another collet or chuck unit 28. Obviously the two chuck units may be of any ordinary or preferred constructions and need not necessarily embody the details described in reference to the tail stock. A rod-like test specimen has its opposite ends gripped in the chucks 22 and 28 and then the tail stock is adjusted about the axis of the clamping bolt 14 to the desired position, whereupon the head stock is rotated through suitable power.

Referring particularly to Figs. 3 and 4, it will be seen that the test specimen there illustrated comprises a substantially cylindrical rod-like body 30 of flexible vulcanized rubber. A cord sample 31 is longitudinally disposed at one side of said rubber body 30 and preferably embedded therein substantially flush with the surface of the rubber. Preferably the end portions of the cord 31 may be looped as indicated at 32 and 33, whereby to effect a more secure anchorage of the cord. In making up this test specimen the rubber compound forming the body 30 may be of any desired type, as, for example, that ordinarily known in the art as tire-sidewall stock. The rubber body may advantageously be first semi-cured and thereafter the cord 31 may be cemented to it, after which the rubber is given its final cure. In this form the cord 31 is firmly held in its initial condition and is not subjected to additional tension or compression when the sample is in its normal straight condition.

When the test piece is placed in and rotated with the chucks as above described, the cord 31 will be alternately compressed and stretched as shown respectively in Figs. 5 and 6, and at the same time the cord will be bent and its fibers will be restrained to some extent by the rubber. The degree of bending, as well as the amount of the tensile and compressive forces, may be varied by adjustment of the tailstock, and such adjustments can be made so as to simulate cord-operating conditions in tires of different sizes and at different loads.

The machine is particularly applicable for determining the fatigue characteristics of cords under alternating elongation and compression. Thus in the rotation of a test specimen such as shown in Fig. 3 while bent in the form shown in Fig. 1 every cross-section of the specimen rotates substantially about its center so that the specimen maintains the form shown in Fig. 3 at all operating speeds. As a result the cord 31 is in its initial condition of extension or compression when the angular position of the specimen is such that the cord 31 is at the top of its rotation at which time it lies in the neutral surface of the specimen. Rotation of the specimen through an angle of 90° in the proper direction will bring the cord to the convex side of the specimen at which time the cord will lie in the horizontal plane passing through the axis of the specimen. This rotation of the specimen and the cord to this position will result in the cord 31 being elongated to the maximum for that particular curvature of the specimen. Rotation of the specimen 90° further will bring the cord to the bottom of the specimen at which time the cord 31 will again lie in the neutral surface of the specimen and as a consequence again will be in its initial condition of extension or compression. A further rotation of 90° brings the cord to the concave side of the specimen at which time the cord lies in the horizontal axial plane and is subjected to the maximum compression for that particular curvature of the specimen. It follows that in the rotation of the specimen theoretically the cord 31 is given an exactly equal extension and compression for each revolution of the specimen and in practice such is substantially the case. The amount of extension and compression increases with the bending of the specimen being zero when straight. The absolute value of these effects in the cord depends upon the initial condition of the cord when the specimen is straight as in Fig. 10. 3. If, for example, the cord is elongated a certain amount when vulcanized in the specimen, the specimen being straight, then in rotation under a bent condition as in Fig. 1 the compression is reduced and the elongation increased by an amount equal to the original elongation. Thus by selection of suitable values of elongation, in the initial condition, and curvature of the specimen the range in variation in length of the cord can be made to extend from any desired compression to any desired elongation. For instance, if desired it can be made to extend from zero compression so that the effect of movement in elongation only, on the durability of the cord, can be determined.

From the diameter of the specimen and its curvature it is extremely simple to theoretically calculate the resulting elongation and compression but practically the results so obtained may not have the desired accuracy in which case the actual length of the cord can be measured by any known methods. To determine the actual effects of vulcanization of the specimen and the bending of same in the machine it is desirable to measure a marked section of substantially unstressed cord before vulcanization, the same section after vulcanization, and finally after mounting in the machine when straight and after the specimen is bent to the desired amount, the latter measurement being taken when the cord is in the horizontal plane.

Even though due to the method of spinning and the resulting structure of cords different sections of the same cord always differ somewhat in physical properties, by testing several specimens under the same conditions consistent averages can be obtained. By progressively changing the curvature of the specimen and taking such averages at each curvature fatigue curves showing the relation between the magnitude of strain and the number of applications to produce rupture may be plotted.

The test specimens may be hollow, if desired, and they may be of other cross-sectional configurations. Furthermore, the degree of hardness and flexibility of the rubber may be varied to suit the requirements of specific tests. By way of example, however, it is here noted that in one extensive research program very satisfactory results were obtained with test specimens of the specific type illustrated in Fig. 3, such specimens measuring one inch in diameter and six inches in length.

Having thus described the invention, what is claimed is:

1. The method of testing textile elements which consists in embedding such elements in a body of flexible material such as rubber, bending said body of flexible material, and causing said body to rotate while maintained in bent condition.

2. The method of testing textile elements which consists in embedding such an element in the surface of a body of flexible material such as rubber, bending said body of flexible material, and causing said body to rotate while maintaining it in bent condition.

3. The method of testing textile elements which consists in embedding such an element at the surface of a rod-like body of flexible material such as rubber, bending said rod-like body of flexible material, and causing said body to rotate about its axis while maintaining it in bent condition, whereby to subject the textile element alternately to tension and compression while it is bent.

4. The method of testing a tire cord which consists in embedding a piece of such cord without tension in or adjacent to the surface of a rod-like body of flexible rubber, bending said body of flexible rubber, and causing said rod-like body of flexible rubber to rotate about its axis while maintaining it in bent condition, whereby to subject the cord alternately to tension and compression.

FREDERICK RAY.